US012210531B2

(12) United States Patent
Bi

(10) Patent No.: US 12,210,531 B2
(45) Date of Patent: Jan. 28, 2025

(54) COMPUTING ARCHITECTURE FOR EXISTING ASSET SYSTEM INTEGRATION

(71) Applicant: COGNIZANT TECHNOLOGY SOLUTIONS U.S. CORPORATION, College Station, TX (US)

(72) Inventor: Kai Bi, Houston, TX (US)

(73) Assignee: COGNIZANT TECHNOLOGY SOLUTIONS U.S. CORPORATION, College Station, TX (US)

( * ) Notice: Subject to any disclaimer, the term of this patent is extended or adjusted under 35 U.S.C. 154(b) by 212 days.

(21) Appl. No.: 17/493,956

(22) Filed: Oct. 5, 2021

(65) Prior Publication Data
US 2022/0107951 A1 Apr. 7, 2022

Related U.S. Application Data

(60) Provisional application No. 63/087,790, filed on Oct. 5, 2020.

(51) Int. Cl.
*G06F 16/2455* (2019.01)
*G06F 16/23* (2019.01)
*G06F 16/2457* (2019.01)

(52) U.S. Cl.
CPC .... *G06F 16/24568* (2019.01); *G06F 16/2365* (2019.01); *G06F 16/2457* (2019.01)

(58) Field of Classification Search
CPC ........... G06F 16/24568; G06F 16/2365; G06F 16/2457
See application file for complete search history.

(56) References Cited

U.S. PATENT DOCUMENTS

| 7,155,433 | B2* | 12/2006 | Lasken | .................. | G06F 16/25 |
| 7,379,934 | B1* | 5/2008 | Forman | ................. | G06F 16/252 |
| | | | | | 707/809 |
| 7,590,573 | B1* | 9/2009 | Bouchard | .............. | G06Q 30/04 |
| | | | | | 705/30 |

(Continued)

OTHER PUBLICATIONS

H.O. Tassone, Plant Accounting Playbook, Apr. 4, 2012, nationalgrid, Version 1.0, pp. 1-217 (Year: 2012).*

(Continued)

*Primary Examiner* — Sherief Badawi
*Assistant Examiner* — Jessica N Le
(74) *Attorney, Agent, or Firm* — CANTOR COLBURN LLP

(57) ABSTRACT

A computing architecture includes a continuous property record (CPR) mass asset model. The CPR mass asset model includes a retirement unit field, an asset location field, and a vintage field for each mass asset. The retirement unit field stores an identifier of the mass asset, the asset location field storing a region of installation of the mass asset, and the vintage field storing a date of the mass asset. The CPR asset model is a wrapper for a corresponding master data structure of an existing asset system. The computing architecture further includes a retirement ledger for storing a postings for the mass assets. The retirement ledger stores at least one line for each transaction using the mass assets. The computing architecture further includes CPR unitization and retirement engine for adding lines to the retirement ledger.

18 Claims, 20 Drawing Sheets

(56) References Cited

U.S. PATENT DOCUMENTS

| | | | | |
|---|---|---|---|---|
| 7,606,743 | B2* | 10/2009 | Orzell | G06Q 10/087 705/28 |
| 7,689,493 | B1* | 3/2010 | Sullivan | G06Q 40/06 705/36 R |
| 7,882,137 | B2* | 2/2011 | Lepman | G06Q 40/123 707/950 |
| 8,417,715 | B1* | 4/2013 | Bruckhaus | G06Q 10/04 705/26.1 |
| 10,942,910 | B1* | 3/2021 | Certain | G06F 16/23 |
| 11,037,238 | B1* | 6/2021 | Mishraky | G06Q 40/03 |
| 11,164,165 | B1* | 11/2021 | Andreev | G06Q 20/02 |
| 11,861,712 | B1* | 1/2024 | Kenigsberg | G06Q 40/06 |
| 2002/0165743 | A1* | 11/2002 | Dahl-Sorensen | G06Q 30/0201 705/7.29 |
| 2008/0172401 | A1* | 7/2008 | Nishiyama | G06Q 10/10 |
| 2010/0114493 | A1* | 5/2010 | Vestal | E21B 41/00 702/9 |
| 2010/0235269 | A1* | 9/2010 | Munoz | G06Q 10/10 707/E17.014 |
| 2014/0136573 | A1* | 5/2014 | Howard | G06F 16/9024 707/803 |
| 2014/0351166 | A1* | 11/2014 | Schlossberg | G06Q 40/06 705/36 R |
| 2014/0365253 | A1* | 12/2014 | Byers | G06Q 30/018 705/7.11 |
| 2017/0127128 | A1* | 5/2017 | Seger | H04N 21/44213 |
| 2019/0251075 | A1* | 8/2019 | Yan | H04L 9/50 |
| 2021/0027377 | A1* | 1/2021 | Rohlfs | G06F 16/24568 |

OTHER PUBLICATIONS

Ulrich Hauke, SAP S/4HANA Cloud for Finance: Balance Reporting—Part 2: Standard reports and standard API for balance reporting, Feb. 19, 2019, SAP Community Log-in Update, pp. 1-7 (Year: 2019).*

* cited by examiner

| Field Name | Key | Description |
|---|---|---|
| Company Code | X | |
| Retirement Unit | X | |
| Vintage | X | |
| Location | X | |
| Industry | | Electric, gas, water, etc. |
| Plant Account | | FERC 300 series accounts |
| CWIP Asset | | |
| RWIP Asset | | |
| CCNC Asset | | |
| PIS Asset | | |
| Reserve 1 Asset | | Retired Depreciation Accrual |
| Reserve 2 Asset | | Cost of Removal |
| Reserve 3 Asset | | Gross Salvage |
| Asset Group | | |
| Unit Price | | Unit Price of the asset |
| Gross Salvage Percentage | | Gross Salvage ratio compared to the retired cost |

| Field Name | Key | Mandatory | Description |
|---|---|---|---|
| Transaction GUID | X | X | 32-byte GUID, representing one source asset transaction, which produces one or multiple accounting documents committed together. |
| Line Item | X | X | Line item |
| Entry Date | | X | Entry date, system time zone. |
| Entry Time | | X | Entry time, system time zone. |
| Entry Timestamp (UTC) | | X | Time stamp, UTC time zone. |
| User Name | | X | User name. |
| Source Transaction | | X | e.g. Conversion, Unitize, Retire, Transfer, Manual Adjustment |
| Activity | | | Specify the purpose of the activity lines, can be the following values: Offset Addition, Offset Retirement, Offset Gross Salvage, Offset Cost of Removal, Addition, Retire, Gross Salvage, or Cost of Removal |
| Activity ID | | X | Group the Offset lines with the Activity lines through the Activity ID. The offset amount and activity amounts under the same activity ID shall sum to zero. |
| Company Code | | X | Company Code |
| Retirement Unit | | X | Retirement Unit |
| Asset Location | | X | Asset Location |
| Vintage Year | | X | Vintage Year |
| Fiscal Year | | X | Fiscal Year. For offline line, Fiscal Year is the same with the accounting document's. For activity line, Fiscal Year is the year that the activity really happened in the history. |
| Period | | X | Fiscal Period. |
| Fiscal Year Period | | X | Fiscal Year Period |
| Ref Document Number | | | Document Number in Universal Journal. Only filled for offset line. |
| Ref Line Item | | | Document Line Item in Universal Journal. Only filled for offset line. |
| Asset Number | | X | PIS or Reserve asset number |
| Asset Sub Number | | X | PIS or Reserve asset sub number |
| Asset Order Number | | | Financed-U Asset Order. Only filled if the source transaction is from asset order (e.g. by Unitize or Retire program). |
| Asset Transaction Type | | | Only filled by the offsetting line |
| GL Account | | | GL Account. Only filled by the offsetting line. |
| Offset Amount in LC | | | Offsetting the amount of the original document. Only filled by the offsetting line. |
| Addition – Amount in LC | | | Addition Amount |
| Addition – Quantity | | | Addition Quantity |
| Retired – Amount in LC | | | Retired Amount |
| Retired – Quantity | | | Retired Quantity |
| Gross Salvage – Amount in LC | | | Gross Salvage Amount |
| Cost of Removal – Amount in LC | | | Cost of Removal Amount |
| Local Currency | | | Local Currency |
| Unit of Measure | | | Unit of Measure |

FIG. 4

| Field Name | Offset Line | Activity Line |
|---|---|---|
| Activity GUID | X | X |
| Line Item | X | X |
| Entry Date | X | X |
| Entry Time | X | X |
| Entry Timestamp (UTC) | X | X |
| User Name | X | X |
| Source Transaction | X | X |
| Activity | X | X |
| Activity ID | X | X |
| Company Code | X | X |
| Retirement Unit | X | X |
| Asset Location | X | X |
| Vintage Year | X | X |
| Fiscal Year | X | X |
| Period | X | X |
| Fiscal Year Period | X | X |
| Ref Document Number | X | |
| Ref Line Item | X | |
| Asset Number | X | X |
| Asset Sub Number | X | X |
| Asset Order Number | X | |
| Asset Transaction Type | X | |
| GL Account | X | |
| Offset Amount in LC | X | |
| Addition – Amount in LC | | X |
| Addition – Quantity | | X |
| Retired – Amount in LC | | X |
| Retired – Quantity | | X |
| Gross Salvage – Amount in LC | | X |
| Cost of Removal – Amount in LC | | X |
| Local Currency | X | X |
| Unit of Measure | X | X |

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU0001 | 2021 | 2021 | Unitize | Offset Addition | 0001 | PIS | $(1,000.00) | | | | | | |
| 1 | RU0001 | 2021 | 2021 | Unitize | Addition | 0001 | PIS | | $1,000.00 | | 10 | | | |
| 1 | RU0002 | 2021 | 2021 | Unitize | Offset Addition | 0002 | PIS | $(2,000.00) | | | | | | |
| 1 | RU0002 | 2021 | 2021 | Unitize | Addition | 0002 | PIS | | $2,000.00 | | 20 | | | |

FIG. 7 — 700

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU0001 | 2021 | 2021 | Unitize | Offset Addition | 0001 | PIS1 | $(1,000.00) | | | | | | |
| 1 | RU0001 | 2021 | 2021 | Unitize | Addition | 0001 | PIS1 | | $1,000.00 | | 10 | | | |
| 1 | RU0002 | 2021 | 2021 | Unitize | Offset Addition | 0002 | PIS2 | $(1,500.00) | | | | | | |
| 1 | RU0002 | 2021 | 2021 | Unitize | Addition | 0002 | PIS2 | | $1,500.00 | | 20 | | | |
| 1 | RU0002 | 2003 | 2021 | Unitize | Offset Cost of Removal | 0003 | Reserve2 | $(500.00) | | | | | | |
| 1 | RU0002 | 2003 | 2021 | Unitize | Cost of Removal | 0003 | Reserve2 | | | | | | $500.00 | |

FIG. 8 — 700

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU0001 | 2003 | 2021 | Retire | Offset Retire | 0001 | PIS | $1,000.00 | | | | | | |
| 1 | RU0001 | 2003 | 2021 | Retire | Retire | 0001 | PIS | | | $(1,000.00) | | 10 | | |

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU001 | 2003 | 2021 | Retire | Offset Retire | 0001 | PIS | $1,000.00 | | | | | | |
| 1 | RU001 | 2003 | 2021 | Retire | Retire | 0001 | PIS | | | $1,000.00 | | -10 | | |
| 1 | RU001 | 2003 | 2021 | Retire | Offset Gross Salvage | 0002 | Reserve3 | $100.00 | | | | | | |
| 1 | RU001 | 2003 | 2021 | Retire | Gross Salvage | 0002 | Reserve3 | | | | | | | $(100.00) |

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU0001 | 2003 | 2021 | Conversion | Offset Addition | 0001 | PIS | ($3,000.00) | | | | | | |
| 1 | RU0001 | 2003 | 2003 | Conversion | Addition | 0001 | PIS | | $2,000.00 | | 200 | | | |
| 1 | RU0001 | 2003 | 2021 | Conversion | Offset Retire | 0002 | PIS | $1,000.00 | | | | | | |
| 1 | RU0001 | 2003 | 2004 | Conversion | Retire | 0002 | PIS | | | $100 | | 10 | | |
| 1 | RU0001 | 2003 | 2005 | Conversion | Retire | 0002 | PIS | | | $100 | | 10 | | |
| 1 | RU0001 | 2003 | 2006 | Conversion | Retire | 0002 | PIS | | | $100 | | 10 | | |
| 1 | RU0001 | 2003 | 2007 | Conversion | Retire | 0002 | PIS | | | $100 | | 10 | | |
| 1 | RU0001 | 2003 | 2008 | Conversion | Retire | 0002 | PIS | | | $100 | | 10 | | |
| 1 | RU0001 | 2003 | 2009 | Conversion | Retire | 0002 | PIS | | | $100 | | 10 | | |
| 1 | RU0001 | 2003 | 2010 | Conversion | Retire | 0002 | PIS | | | $100 | | 10 | | |
| 1 | RU0001 | 2003 | 2011 | Conversion | Retire | 0002 | PIS | | | $100 | | 10 | | |
| 1 | RU0001 | 2003 | 2012 | Conversion | Retire | 0002 | PIS | | | $100 | | 10 | | |
| 1 | RU0001 | 2003 | 2013 | Conversion | Retire | 0002 | PIS | | | $100 | | 10 | | |
| 1 | RU0001 | 2003 | 2021 | Conversion | Offset COR | 0003 | Reserve2 | ($2,200.00) | | | | | | |
| 1 | RU0001 | 2003 | 2003 | Conversion | COR | 0003 | Reserve2 | | | | | | $200.00 | |
| 1 | RU0001 | 2003 | 2004 | Conversion | COR | 0003 | Reserve2 | | | | | | $200.00 | |
| 1 | RU0001 | 2003 | 2005 | Conversion | COR | 0003 | Reserve2 | | | | | | $200.00 | |
| 1 | RU0001 | 2003 | 2006 | Conversion | COR | 0003 | Reserve2 | | | | | | $200.00 | |
| 1 | RU0001 | 2003 | 2007 | Conversion | COR | 0003 | Reserve2 | | | | | | $200.00 | |
| 1 | RU0001 | 2003 | 2008 | Conversion | COR | 0003 | Reserve2 | | | | | | $200.00 | |
| 1 | RU0001 | 2003 | 2009 | Conversion | COR | 0003 | Reserve2 | | | | | | $200.00 | |
| 1 | RU0001 | 2003 | 2010 | Conversion | COR | 0003 | Reserve2 | | | | | | $200.00 | |
| 1 | RU0001 | 2003 | 2011 | Conversion | COR | 0003 | Reserve2 | | | | | | $200.00 | |
| 1 | RU0001 | 2003 | 2012 | Conversion | COR | 0003 | Reserve2 | | | | | | $200.00 | |
| 1 | RU0001 | 2003 | 2013 | Conversion | COR | 0003 | Reserve2 | | | | | | $200.00 | |
| 1 | RU0001 | 2003 | 2021 | Conversion | Offset Gross Salvage | 0004 | Reserve3 | $55.00 | | | | | | |
| 1 | RU0001 | 2003 | 2003 | Conversion | Gross Salvage | 0004 | Reserve3 | | | | | | | $5.00 |
| 1 | RU0001 | 2003 | 2004 | Conversion | Gross Salvage | 0004 | Reserve3 | | | | | | | $5.00 |
| 1 | RU0001 | 2003 | 2005 | Conversion | Gross Salvage | 0004 | Reserve3 | | | | | | | $5.00 |
| 1 | RU0001 | 2003 | 2006 | Conversion | Gross Salvage | 0004 | Reserve3 | | | | | | | $5.00 |
| 1 | RU0001 | 2003 | 2007 | Conversion | Gross Salvage | 0004 | Reserve3 | | | | | | | $5.00 |
| 1 | RU0001 | 2003 | 2008 | Conversion | Gross Salvage | 0004 | Reserve3 | | | | | | | $5.00 |
| 1 | RU0001 | 2003 | 2009 | Conversion | Gross Salvage | 0004 | Reserve3 | | | | | | | $5.00 |
| 1 | RU0001 | 2003 | 2010 | Conversion | Gross Salvage | 0004 | Reserve3 | | | | | | | $5.00 |
| 1 | RU0001 | 2003 | 2011 | Conversion | Gross Salvage | 0004 | Reserve3 | | | | | | | $5.00 |
| 1 | RU0001 | 2003 | 2012 | Conversion | Gross Salvage | 0004 | Reserve3 | | | | | | | $5.00 |
| 1 | RU0001 | 2003 | 2013 | Conversion | Gross Salvage | 0004 | Reserve3 | | | | | | | $5.00 |

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU0001 | 2003 | 2010 | Manual Adjustment | Addition | 0001 | PIS |  |  |  | 10 |  |  |  |
| 1 | RU0001 | 2004 | 2011 | Manual Adjustment | Retire | 0002 | PIS |  |  | 3 |  |  |  |  |
| 2 | RU0002 | 2004 | 2011 | Manual Adjustment | Retire | 0001 | PIS |  |  | 5 |  |  |  |  |

FIG. 12 — 1200

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU0001 | 2020 | 2021 | Manual Adjustment | Offset Addition | 0001 | PIS | $(1,000.00) |  |  |  |  |  |  |
| 1 | RU0001 | 2020 | 2020 | Manual Adjustment | Addition | 0001 | PIS |  | $1,000.00 |  | 100 |  |  |  |
| 1 | RU0001 | 2003 | 2021 | Manual Adjustment | Offset Retirement | 0002 | PIS | $(500.00) |  |  |  |  |  |  |
| 1 | RU0001 | 2003 | 2019 | Manual Adjustment | Retire | 0002 | PIS |  |  | $500.00 |  | 5 |  |  |
| 1 | RU0001 | 2005 | 2021 | Manual Adjustment | Offset Cost of Removal | 0003 | Reserve2 | $(2,000.00) |  |  |  |  |  |  |
| 1 | RU0001 | 2005 | 2020 | Manual Adjustment | Cost of Removal | 0003 | Reserve2 |  |  |  |  |  | $2,000.00 |  |

| Transaction ID | Retirement Unit | Vintage Year | Fiscal Year | Source Transaction | Activity | Activity ID | Asset | Offset Amount | Addition | Retired | Addition Quantity | Retired Quantity | Cost of Removal | Gross Salvage |
|---|---|---|---|---|---|---|---|---|---|---|---|---|---|---|
| 1 | RU0001 | 2003 | 2021 | Transfer | Offset Addition | 0001 | PIS | $1,000.00 | | | | | | |
| 1 | RU0001 | 2003 | 2003 | Transfer | Addition | 0001 | PIS | | $(1,000.00) | | | | | |
| 1 | RU0002 | 2003 | 2021 | Transfer | Offset Addition | 0002 | PIS | $(1,000.00) | $1,000.00 | | | | | |
| 1 | RU0002 | 2003 | 2003 | Transfer | Addition | 0002 | PIS | | $1,000.00 | | (100) | | | |
| 1 | RU0001 | 2003 | 2021 | Transfer | Offset Retirement | 0003 | PIS | $(500.00) | | | 100 | | | |
| 1 | RU0001 | 2003 | 2004 | Transfer | Retirement | 0003 | PIS | | | $200.00 | | 20 | | |
| 1 | RU0001 | 2003 | 2005 | Transfer | Retirement | 0003 | PIS | | | $200.00 | | 20 | | |
| 1 | RU0001 | 2003 | 2006 | Transfer | Retirement | 0003 | PIS | | | $100.00 | | 10 | | |
| 1 | RU0002 | 2003 | 2021 | Transfer | Offset Retirement | 0004 | PIS | $500.00 | | | | | | |
| 1 | RU0002 | 2003 | 2004 | Transfer | Retirement | 0004 | PIS | | | $(200.00) | | (20) | | |
| 1 | RU0002 | 2003 | 2005 | Transfer | Retirement | 0004 | PIS | | | $(200.00) | | (20) | | |
| 1 | RU0002 | 2003 | 2006 | Transfer | Retirement | 0004 | PIS | | | $(100.00) | | (10) | | |
| 1 | RU0001 | 2003 | 2021 | Transfer | Offset Cost of Removal | 0005 | Reserve2 | $800.00 | | | | | | |
| 1 | RU0001 | 2003 | 2004 | Transfer | Cost of Removal | 0005 | Reserve2 | | | | | | $(300.00) | |
| 1 | RU0001 | 2003 | 2005 | Transfer | Cost of Removal | 0005 | Reserve2 | | | | | | $(300.00) | |
| 1 | RU0001 | 2003 | 2006 | Transfer | Cost of Removal | 0005 | Reserve2 | | | | | | $(200.00) | |
| 1 | RU0002 | 2003 | 2021 | Transfer | Offset Cost of Removal | 0006 | Reserve2 | $(800.00) | | | | | | |
| 1 | RU0002 | 2003 | 2004 | Transfer | Cost of Removal | 0006 | Reserve2 | | | | | | $300.00 | |
| 1 | RU0002 | 2003 | 2005 | Transfer | Cost of Removal | 0006 | Reserve2 | | | | | | $300.00 | |
| 1 | RU0002 | 2003 | 2006 | Transfer | Cost of Removal | 0006 | Reserve2 | | | | | | $200.00 | |
| 1 | RU0001 | 2003 | 2021 | Transfer | Offset Gross Salvage | 0007 | Reserve3 | $(50.00) | | | | | | |
| 1 | RU0001 | 2003 | 2004 | Transfer | Gross Salvage | 0007 | Reserve3 | | | | | | | $20.00 |
| 1 | RU0001 | 2003 | 2005 | Transfer | Gross Salvage | 0007 | Reserve3 | | | | | | | $20.00 |
| 1 | RU0001 | 2003 | 2006 | Transfer | Gross Salvage | 0007 | Reserve3 | | | | | | | $10.00 |
| 1 | RU0002 | 2003 | 2021 | Transfer | Offset Gross Salvage | 0008 | Reserve3 | $50.00 | | | | | | |
| 1 | RU0002 | 2003 | 2004 | Transfer | Gross Salvage | 0008 | Reserve3 | | | | | | | $(20.00) |
| 1 | RU0002 | 2003 | 2005 | Transfer | Gross Salvage | 0008 | Reserve3 | | | | | | | $(20.00) |
| 1 | RU0002 | 2003 | 2006 | Transfer | Gross Salvage | 0008 | Reserve3 | | | | | | | $(10.00) |

| Year | BOY Plant | EOY Retire | Depreciation Rate | Annual Depreciation | BOY Reserve | EOY Reserve | Comment |
|---|---|---|---|---|---|---|---|
| 2010 | $10,000 | | 10% | $1,000 | $0 | $-1,000 | |
| 2011 | $10,000 | | 10% | $1,000 | $-1,000 | $-2,000 | |
| 2012 | $10,000 | | 10% | $1,000 | $-2,000 | $-3,000 | |
| 2013 | $10,000 | | 10% | $1,000 | $-3,000 | $-4,000 | |
| 2014 | $10,000 | $-2,000 | 10% | $1,000 | $-4,000 | $-3,000 | =-4000 – 1000 + 2000 |
| 2015 | $8,000 | | 10% | $800 | $-3,000 | $-3,800 | |
| 2016 | $8,000 | | 10% | $800 | $-3,800 | $-4,600 | |
| 2017 | $8,000 | | 10% | $800 | $-4,600 | $-5,400 | |
| 2018 | $8,000 | | 10% | $800 | $-5,400 | $-6,200 | |
| 2019 | $8,000 | $-8,000 | 10% | $800 | $-6,200 | $1,000 | =-6200-800+8000 |
| 2020 | $0 | | 10% | $0 | $1,000 | $1,000 | |

*FIG. 14* ← 1400

| Field Name | Key | Description |
|---|---|---|
| Asset Group | X | |
| Long Text | | |
| Short Text | | |

*FIG. 15* ← 1500

| Field Name | Key | Description |
|---|---|---|
| Company Code | X | |
| Asset Location | X | |
| Asset Group | X | |
| Valid From | X | |
| Valid To | | |
| Retirement Dispersion Curve | | The result from previous depreciation study shall be stored here |
| Average Service Life (in years) | | The result from previous depreciation study shall be stored here |
| Average Remaining Life (in years) | | The result from previous depreciation study shall be stored here |
| Estimated Net Salvage % | | The result from previous depreciation study shall be stored here |
| Depreciation Rate (yearly) | | The result from previous depreciation study shall be stored here. And the rate will drive the mass asset monthly depreciation. |

COMPUTING ARCHITECTURE FOR EXISTING ASSET SYSTEM INTEGRATION

CROSS-REFERENCE TO RELATED APPLICATIONS

This application is a non-provisional application of, and thereby claims benefit under 35 U.S.C. § 119(e) to, U.S. Pat. Ser. No. 63/087,790, filed on Oct. 5, 2020, entitled, "Enhanced Data Solution for Regulated Property and Mass Assets." U.S. Pat. Ser. No. 63/087,790, including exhibits, are incorporated in the detailed description in its entirety.

BACKGROUND

Commercially available software provides software solutions for a variety of domains. In some circumstances, the software solution provides basic functionality for a particular domain instead of a comprehensive solution that builds on the basic functionality. In such a scenario, the software solution may provide plug-in support, whereby the software solution itself has a plugin manager that allows its features to be extended and customized by linking with external plug-in. However, without such support, a challenge exists in extending the underlying basic functionality of the software solution to a more comprehensive solution.

SUMMARY

In general, in one aspect, one or more embodiments relate to a computing architecture that includes a continuous property record (CPR) mass asset model. The CPR mass asset model includes a retirement unit field, an asset location field, and a vintage field for each mass asset. The retirement unit field stores an identifier of the mass asset, the asset location field storing a region of installation of the mass asset, and the vintage field storing a date of the mass asset. The CPR asset model is a wrapper for a corresponding master data structure of an existing asset system. The computing architecture further includes a retirement ledger for storing a postings for the mass assets. The retirement ledger stores at least one line for each transaction using the mass assets. The computing architecture further includes CPR unitization and retirement engine for adding lines to the retirement ledger.

In general, in one aspect, one or more embodiments relate to a stored data structure stored in memory. The data structure includes a continuous property record (CPR) mass asset model. The CPR mass asset model includes a retirement unit field, an asset location field, and a vintage field for each mass asset. The retirement unit field stores an identifier of the mass asset, the asset location field storing a region of installation of the mass asset, and the vintage field storing a date of the mass asset. The CPR asset model is a wrapper for a corresponding existing asset master data structure.

In general, in one aspect, one or more embodiments relate to a non-transitory computer readable medium that includes computer readable program code for causing a computer system to perform operations. The operations include storing a continuous property record (CPR) mass asset model that includes a retirement unit field, an asset location field, and a vintage field for each mass asset, wherein the retirement unit field stores an identifier of the mass asset, the asset location field storing a region of installation of the mass asset, and the vintage field storing a date of the mass asset. The CPR asset model is a wrapper for a corresponding existing asset master data structure. The operations further include manipulating a retirement ledger for storing a plurality of postings for the plurality of mass assets, wherein the retirement ledger stores at least one line for each transaction using the mass assets.

Other aspects of the invention will be apparent from the following description and the appended claims.

BRIEF DESCRIPTION OF DRAWINGS

FIG. 3, FIG. 4, and FIG. 5 show example tables layouts in accordance with one or more embodiments.

FIG. 6, FIG. 7, FIG. 8, FIG. 9, FIG. 10, FIG. 11, FIG. 12, FIG. 13, FIG. 14, and FIG. 15 show examples of tables in accordance with one or more embodiments.

FIG. 16 shows an example table structure in accordance with one or more embodiments.

FIG. 17, FIG. 18, FIG. 19, FIG. 20, FIG. 21, FIG. 22, and FIG. 23 show example user interfaces of the software architecture in accordance with one or more embodiments.

DETAILED DESCRIPTION

Figure 1:
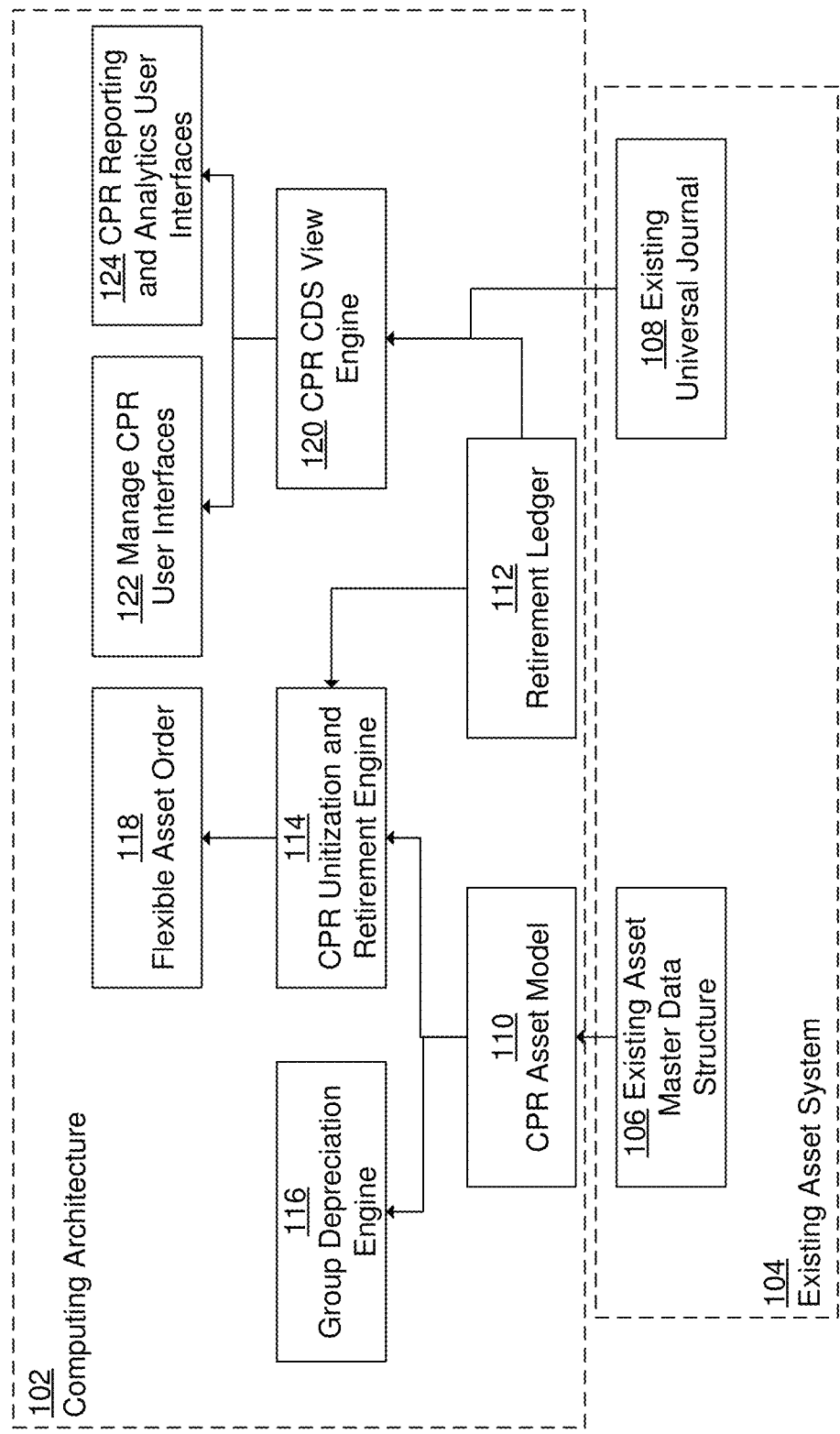
FIG. 1 and FIG. 2 shows diagrams of a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to extending the underlying basic functionality of a software solution to a more comprehensive solution. Specifically, one or more embodiments are directed to a computing architecture that integrates with and extends the functionality of an asset management system. An asset is any resource owned or controlled by a business or an economic entity. An asset to a business is anything tangible or intangible that can be used to produce possible economic value to a business. Asset accounting is the processed by which the monitoring and management of fixed assets is performed.

An existing software solution includes functionality to perform asset accounting for single assets. One or more embodiments are directed to a computing architecture built on the existing software solution to manage mass assets. The difference between a single asset and a mass asset may be defined as follows. A single asset is constructed, unitized, depreciated, and retired individually. For example, substation, power generation plant. A mass asset includes a large number of items of the same type, and are constructed, unitized, depreciated, and retired with many items together. For example, poles and pipes are mass assets. It is not economic to manage mass assets individually because of the sheer volume of mass assets. Rather, mass assets are managed on the level of retirement unit+vintage+location. "Location" represents an area. For example, all the poles built in year 2018 in southern Houston area could be represented by one mass asset. Thus, a mass asset is a group of single assets joined together for accounting purposes.

The resulting computing architecture is a hybrid solution that not only combines the functions of the traditional processing and existing accounting system solutions but creates an enhanced, more integrated, more efficient, and more functional property and group or mass asset capitalization reporting and capture system for utility companies.

General Discussion of Single Assets and Mass Assets

By way of an example, in asset-intensive industries like utility industry, construction work takes relatively long duration, easily across multiple years. Regulation allows utilities start asset depreciation before a plant is put in service, to recover the cost earlier and make utilities sustainable despite huge capital investment. Depreciation is counted as part of cost of service, which is the underline revenue driver of utilities.

Once construction work is field completed, the asset is in status CCNC (Construction Completed Not Classified), with which depreciation is allowed to start although the asset is not in service yet. This early depreciation is important for utilities as there still could be many months or even years until the asset is finally put in service.

The existing software solution was designed in a way more tailored for industries like production or real-estate, where there is no Construction Completed Not Classified (CCNC) status in between Construction Work in Progress (CWIP) and Plant in Service (PIS). A general data processing system standard capitalization process consists of two steps: firstly, settlement from cost object to AUC asset, and then settlement further to PIS once the plant is in service.

The computing architecture expands the capitalization process by making it three steps. Once construction work is essentially finished, which is called field complete, the costs are settled to CCNC assets on which depreciation may start. And then in the final unitization phase, the costs move to PIS assets. A general data processing system standard works best when there is only one AUC asset per cost object; while the computing architecture according to one or more embodiments enable an end user to easily manage multiple assets based on the retirement units involved in the construction work.

Mass assets of different retirement units, if they are installed together and retired together, can be put into the same group asset, to depreciate together with the same rate. Utilities have established actuarial approaches to calculate the service life and net salvage, which is called depreciation study, to derive the depreciation rates of a group of assets. The group method allows the more accurate projection of lives for group using statistics to determine the pattern of retirements as compared to having to project a "point estimate" of life for each individual asset. Additionally, putting mass assets under group makes it much easier to adjust the depreciation rates together when necessary.

With group asset, the acquisition, transfer, and retirement still happen on individual asset level, but the depreciation happens on the group asset level. Once an asset joins a group asset, the group asset is reported together within the group. One or more embodiments provide a computing architecture that uses the single asset existing software solution for mass assets.

Computing Architecture

Turning now to the Figures, FIG. 1 shows a diagram of a computing architecture (102) that integrates with the existing asset system (104). The existing asset system includes an existing asset master data structure (106) and an existing universal journal (108). The existing asset master data structure is a data repository for storing single assets. The existing universal journal is a data repository and software for storing accounts. The parts of the computing architecture work together to fulfill the following requirements from mass or regulated asset accounting: retirement transaction and accounting document postings compliant to public utility accounting principle, defined by FERC (Federal Energy Regulatory Commission) and NARUC (National Association of Regulatory Utility Commissioners), Group depreciation, Asset installation and retirement history to support depreciation study, Continuing Property Records, and Reporting and analytics.

Turning now to the continuing property records (CPR) asset model (110) in FIG. 1, for mass or regulated asset, the Accumulated Depreciation Reserve (under FERC Account 108) has the following components: Accumulated Depreciation, Cost of Removal, and Gross Salvage. The computing architecture introduces new asset object types in order to categorize the balances on 108, and to facilitate the special retirement posting compliant to public utility accounting principle. The asset objects are still the standard master data and function from the existing asset systems. However, the semantics of newly introduced asset object types are represented through the CPR data structure of the computing architecture. The CPR data structure of the computing architecture tags each included asset object with the corresponding asset object type, so that each asset object has specific meaning when it is used by the computing architecture. Thus, the CPR data structure acts as a wrapper to the asset objects, thereby making mass assets represented.

One new asset object type is reserve asset 1 for (retired) Depreciation Accrual. Reserve asset 1 object bears the retired depreciation accrual made by the computing architecture upon retirement posting. The existing asset system provides a solid and powerful posting and depreciation engine. However, the existing asset system does not fully comply to public utility accounting principle. For example, the existing asset system cannot retire the full depreciation accrual upon retirement posting. Therefore, the computing architecture provides its own retirement transaction, and posts the retired depreciation accrual onto the Reserve Asset 1. Reserve Asset 1 balance is supposed to be reported together with asset systems' own accumulated depreciation balance of a plant in service (PIS), to form the total balance on Accumulated Depreciation in the balance reports.

Another new asset object type is reserve asset 2 for Cost of Removal. Upon unitization, removal work in progress (RWIP) balance is moved to Reserve Asset 2, through an acquisition transaction type.

Another new asset object type is reserve asset 3 for Gross Salvage. Upon retirement, the computing architecture posts the gross salvage onto this asset, through an acquisition transaction type. The reserve asset 3 typically has negative balance, as gross salvage is credit account.

Figure 2:
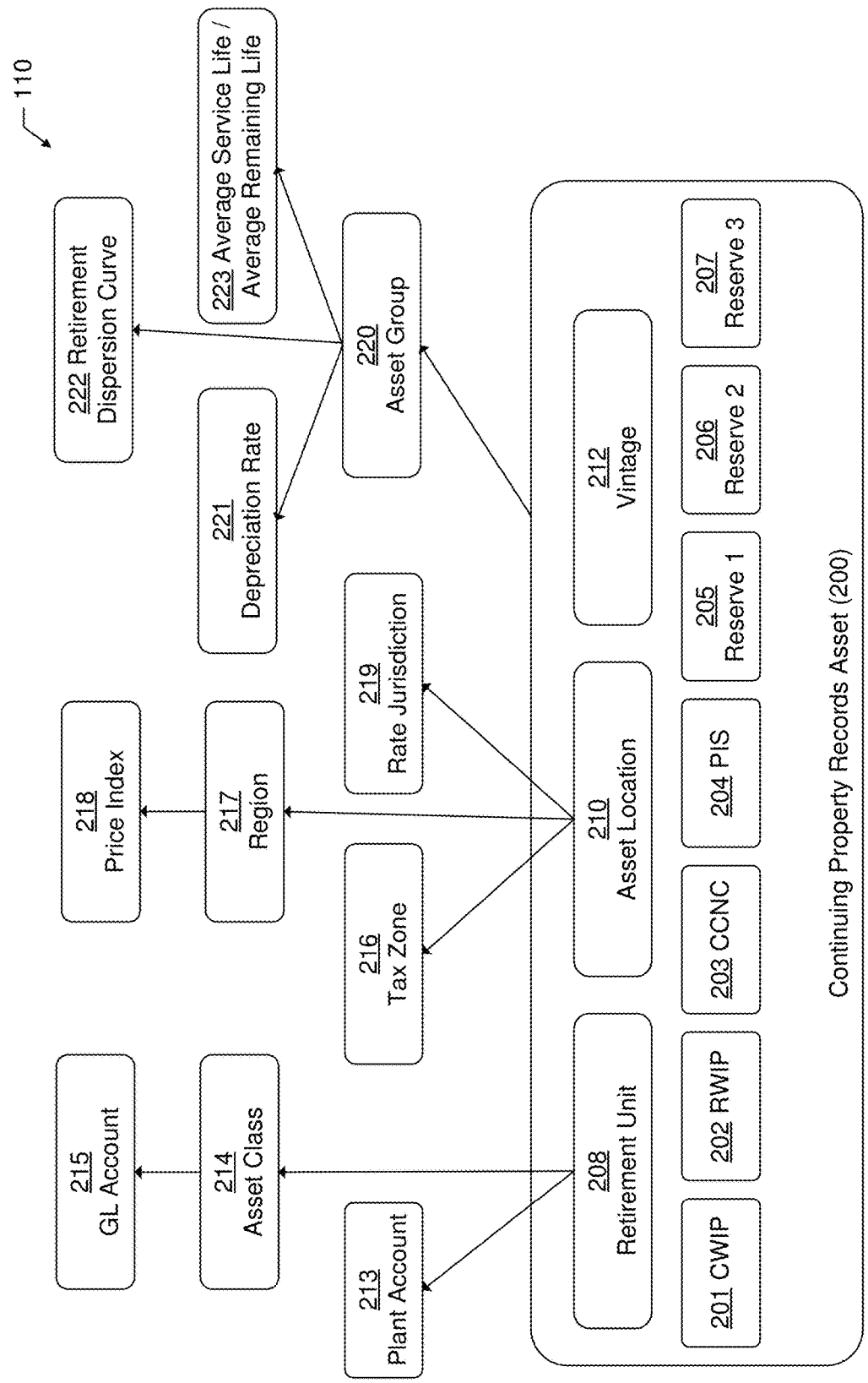

To manage the asset life cycle, and also to enable all reporting dimensions, the computing architecture has architecture shown in FIG. 2 the Continuing Property Records asset model (110) that is a data structure stored in the data repository. Firstly, the CPR asset model (110) groups the stored asset objects which reflect the different stages of lifecycle of one CPR asset (200). The stored asset objects are CWIP (Construction Work in Progress) (201), RWIP (Removal Work in Progress) (202), CCNC (Construction Completed Not Classified) (203), PIS (Plant in Service) (204), and Reserve 1-3 (205, 206, 207).

To manage with the statistical nature of mass asset, and also to be compliant to the regulatory reporting requirements, and depreciation study's analytical requirements, the computing architecture CPR asset model (110) introduces the dimensions of retirement unit object (208), asset location object (210), and vintage object (212). The retirement unit object (208) links to the reporting dimensions for plant account (213) and asset class (214), which links to the general ledger account (215). The asset location (i.e., the region of the asset) object (210) links to the property tax zone (216), the region (217) being used to deflate the retired original cost in retirement transaction, which links to the price index (218), and the rate jurisdiction (219). CPR asset also links to an asset group object (220) with a corresponding depreciation rate (221), retirement dispersion curve (222), and an average service life/average remaining life (223). FIG. 3 shows the CPR database table design (300) with the CPR asset objects.

Returning to FIG. 1, the retirement ledger (112) keeps a precise and unambiguous history of asset installation and retirement, and to fulfill the reporting requirements. The retirement ledge is an additional database table to store the asset history, complementing the information in existing universal journal (108). retirement ledger (112) provides an "extension" functionality to the existing universal journal leading ledger. When combining the retirement ledger (112) and Leading Ledger together, the "offset" balance in the retirement ledger offsets the balance in the leading ledger; while the "activity" balance in the retirement ledger therefore stands out and provides more precise "addition" and "retirement" history of the asset. Therefore, retirement ledger (112) restores a true operational view of the asset history; while the leading ledger provides the accounting view.

The computing architecture updates the retirement ledger (112) and keeps the retirement ledge (112) synchronized with universal journal (108). Inconsistencies are identified and resolved. Through the computing architecture (102) rather than the existing asset system (104), the user converts, unitizes, retires, transfers, or adjusts asset objects. A reconciliation report is provided by the computing architecture to show the inconsistency, if any, between retirement ledger (112) and the universal journal (108).

Thus, the use of the retirement ledger (112) may provide for the following benefits. The use of the retirement ledger (112) holds the long history of converted legacy assets, so that, after the production cut-over, not only the asset's balance snapshot is available, but also its long history, so that depreciation studies could be conducted immediately after a very recent go-live.

The retirement ledger (112) may also provide a journal for quantity information. Although asset accounting document can contain quantity information and existing asset system's standard logic would update the quantity field of asset object accordingly, the leading ledger cannot act as a quantity journal which reflects the true historical year when the quantity of retirement units were installed or retired. Furthermore, retirement ledger (112) can present the precise root cause of the quantity change. For example, the decrease of 5 to the quantity: whether it is caused by decrease to 5 addition, or by increase to 5 retirement.

The retirement ledger (112) further ensures that transferring assets can bring together the asset addition and retirement history, record the end user manual adjustments to the quantity or amount, even against fiscal period, which was already closed, so that the adjustment can reflect the true addition or retirement history. Additionally, the retirement ledger (112) provides more precise semantics of the asset transaction. For example, due to technical restriction, mass asset retirement is accomplished through asset acquisition posting. retirement ledger (112) line item provides the true meaning to the acquisition posting, whether they are really "addition", or "retirement".

The following are principles of retirement ledger (112) in accordance with some embodiments. The retirement ledger (112) shall cover PIS and Reserve assets only. CWIP, RWIP, CCNC are not to be included in retirement ledger (112) as their details are changing quite dynamically. The retirement ledger (112) is to record addition, retirement, and net salvage according to their true operational history; while the universal journal stores the history from accounting perspective. retirement ledger (112) does not store depreciation related information. Depreciation is to completely rely on universal journal and the existing asset system's standard depreciation logic. Additionally, "balance" and financial reports and statements rely on universal journal data. The retirement ledger (112) is to provide refined meaning to the transactions, and also mainly for advanced depreciation study purpose.

FIG. 4 shows a table structure (400) of the retirement ledger.

The computing architecture asset transaction, represented by Source Transaction field, can be from the following Unitize: e.g., Unitization program execution, Retire: e.g., Retirement program execution, Transfer, Manual Adjustment, and Conversion.

The software architecture modifies the data repository in response to an asset transaction. Specifically, an asset transaction might cause the software architecture to produce one of multiple accounting postings, as well as multiple line items in the retirement ledger, which shall all be committed to the database altogether. In some cases, an asset transaction might not cause the software architecture to produce any accounting document, but just updating the retirement ledger only. For example, the software architecture may perform pure adjustment to the quantity.

A transaction can have multiple lines in the retirement ledger, identified by the "Line Item" field. The meaning of the line is represented by the activity field. In the asset field, offset line is inserted if the transaction has a corresponding accounting document line item. The offset line is supposed to offset the amount in the original accounting document line item. The following fields are mandatory for the offset line in at least some embodiments: GL Account, Transaction Type, Reference Document Number, Reference Line Item. The activity field may also have activity line, which is a line item which is not an offset line. Activity lines restore the addition or retirement activity in the historical fiscal year, meaning they could be in a different fiscal year than the offset line. The offset line's fiscal year reflects the accounting document's fiscal year, not necessarily the true history of the addition or retirement activities.

An activity is contained within a transaction in the retirement ledger, representing an addition, retirement, cost of removal, or gross salvage. An activity is identified through Activity ID in the retirement ledger. Within one single transaction, line items with the same activity ID represent line items of the activity.

With an activity, there could be one offset line, corresponding to the accounting document's line item. Or, if the activity does not update accounting balance, it will have no offset line. For example, when manually adjust the quantity, the activity has only changes to quantity, therefore the activity will not have offset line. Within one activity ID, the offset amount and the corresponding activity amounts add up together shall be zero.

One activity ID shall be made against only one asset, represented by the asset number/sub number, or retirement unit/location/vintage combination. The ACID properties of transaction are ensured per each activity and its corresponding accounting document.

FIG. 5 shows a table (500) identifying fields in the retirement ledger. Specifically, the table shows which fields in the retirement ledger are offset fields denoted by an "x" in the offset field column and which fields are activity fields denoted by an "x" in the activity field column.

Continuing with the retirement ledger (112), multiple primitive operations are supported by the software architecture. An ABAP utility class is presented as an entry point to update the retirement ledger.

FIG. 6 shows an example table (600) in describing a primitive operation. In the example, consider the scenario in which a unitization posting from one CCNC asset to two PIS assets. In the example, Cr. is credit and Dr. is debit.

| Cr. CCNC (RU0001) | $-3,000.00 |
| Dr. PIS1 (RU0001) | $ 1,000.00 |
| Dr. PIS2 (RU0002) | $ 2,000.00 |

Responsive the unitization posting, the software architecture (specifically, the CPR unitization and retirement engine (114) in FIG. 1) inserts the four lines (i.e., rows) shown in FIG. 6 into the retirement ledger upon a unitization posting. Namely, FIG. 6 shows the four lines in the retirement ledger table.

Additionally, the CPR unitization and retirement engine (114) in FIG. 1 creates offset lines as shown by offset addition in table (600) of FIG. 6. The two offset lines have the same but opposite amounts as the two accounting document lines on the two PIS assets, have accounting document and line-item reference, and have GL Account and Transaction Type filled. The CPR unitization and retirement engine ensures that within one activity ID, the Offset Amount and Addition Amount add up together should be zero. Quantity information may not need to be carried in the accounting document; rather, retirement ledger will form a quantity journal. One Transaction ID represents one transaction whose accounting document and retirement ledger update shall be committed together. One transaction can contain multiple activities.

FIG. 7 shows another example table (700) from operations of the CPR unitization and retirement engine. In FIG. 7, the example includes a Cost of Removal unitization.

| Cr. CCNC (RU0001) | $-3,000.00 | |
| Dr. PIS1 (RU0001) | $ 1,000.00 | |
| Dr. PIS2 (RU0002) | $ 1,500.00 | |
| Dr. Reserve2 (RU0002) | $ 500.00 | -- Reserve2's vintage year is 2003 |

The corresponding retirement ledger is shown in the table of FIG. 7

Continuing with the example, a retirement to RU0001 of vintage year 2003 is made through the following posting.

| Cr. PIS (RU0001) | $-1,000.00 |
| Dr. Reserve1 (RU0001) | $ 1,000.00 |

The entries (800) shown in FIG. 8 are inserted by the CPR unitization and retirement engine into the retirement ledger. The accounting document line on Reserve1 does not have a corresponding line in the retirement ledger, as the retirement is already represented by the first line on the PIS.

Continuing with the example, a retirement to RU0001 of vintage year 2003, with gross salvage, is made through the following posting.

| Cr. PIS (RU0001) | $-1,000.00 |
| Dr. Reserve1 (RU0001) | $ 1,000.00 |
| Cr. Reserve3 (RU0001) | $ -100.00 |
| Dr. Gross Salvage Clearing | $ 100.00 |

As part of the posting, the entries shown in the table (900) of FIG. 9 are inserted by the CPR unitization and retirement engine into the retirement ledger.

For conversion of legacy asset balance, the software architecture introduces accounting postings as below, to capture the balance snapshot upon the production cut-over.

| Dr. PIS (RU0001) | $ 2,000.00 |
| Cr. Migration Account | $-2,000.00 |
| Cr. PIS (RU0001) | $-1,000.00 |
| Dr. Migration Account | $ 1,000.00 |
| Dr. Reserve2 (RU0001) | $ 2,200.00 |
| Cr. Migration Account | $-2,200.00 |
| Cr. Reserve3 (RU0001) | $ -55.00 |
| Dr. Migration Account | $ 55.00 |

The above posting only provides the balance snapshot upon the cut-over. It cannot provide the historical addition or retirement information. However, the software architecture includes a conversion program that supports the historical details are provided and could be stored in the retirement ledger with the entries (1000) shown in FIG. 10.

There are cases when end user needs to update the quantity of asset manually, after an inventory process. At the first glance, it might be a simple updating of the quantity of the asset. However, in order to ensure this adjustment does not introduce noise to the future depreciation study, end user needs to identify: Which vintage year's quantity shall be updated; What is the origination causing the adjustment to the quantity: due to an imprecise record of addition or retirement, happened in which year?

The retirement ledger supports the manual adjustment capture the above answers. No accounting document needs to be posted. In the example of FIG. 11, the retirement ledger (1100) is updated to include an adjustment with -10 decreased to the addition quantity happened in 2010 for a vintage year 2003 asset; an adjustment with 3 increase to the retired quantity (booked as negative) in 2011 for a vintage year 2004 asset; and an adjustment with 5 decrease to the retired quantity (booked as positive) in 2011 for a vintage year 2004 asset. For pure quantity adjustment without amount and accounting document, the CPR unitization and retirement engine does not require the quantities of an activity sum to zero.

In some cases, the user wants to update the asset balance manually for mass assets. The software architecture supports the manual update through the retirement ledger. FIG. 12 shows an example postings and retirement ledger updates to accomplish an increase of $1,000.00 of addition to a vintage year 2020 asset which was installed in 2020; a decrease of $500.00 of retirement to a vintage year 2003 asset which should have happened in 2019, an increase of $2,000.00 of cost of removal to a vintage year 2005 asset which should have happened in 2020. The net balance of the above 3 lines shall be offset to a specified cost center.

The accounting documents are posted in 2021, with the following line items:

| | |
|---|---|
| Dr. PIS (RU0001/2020) | $ 1,000.00 |
| Dr. PIS (RU0001/2003) | $ 500.00 |
| Dr. Reserve2 (RU0001/2005) | $ 2,000.00 |
| Cr. Cost Center | $(3,500.00) |

In the example, the CPR unitization and retirement engine inserts the entries of FIG. 12 into the retirement ledger (1200). Notably, in the example, the group depreciation engine (116) in FIG. 1, generates a catch-up document as well. However, according to the principle of retirement ledger, depreciation is not recorded in the retirement ledger. The depreciation catch-up document will be purely accounting postings without retirement ledger entry. Further, the retirement ledger update is not restricted by the closed posting year. It can still insert line items for fiscal year older than 2021 (the current fiscal year).

Mass asset transfers are also different than existing asset system's asset transfers. which in general transfers the asset balance. This transaction not only transfers the balance, but all the history, so that in the target asset, depreciation study may still be possible with full details of history.

In the following example and turning to FIG. 13, consider the scenario that an asset transfer happened in 2021 from retirement unit RU0001 of vintage year 2003 to retirement unit RU0002 of vintage year 2003. The accounting documents are:

| | | |
|---|---|---|
| Cr. PIS (RU0001/2003) | $ −1,000.00 | --installed balance from the source |
| Dr. PIS (RU0002/2003) | $ 1,000.00 | --installed balance to target |
| Dr. PIS (RU0001/2003) | $ 500.00 | --retired balance from the source |
| Cr. PIS (RU0002/2003) | $ −500.00 | --retired balance to target |
| Cr. Reserve2 (RU0001/2003) | $ −800.00 | --cost of removal from the source |
| Dr. Reserve2 (RU0002/2003) | $ 800.00 | --cost of removal to the target |
| Dr. Reserve3 (RU0001/2003) | $ 50.00 | --gross salvage from the source |
| Cr. Reserve3 (RU0002/2003) | $ −50.00 | --gross salvage to the target |

The entries (1300) are inserted into the retirement ledger, with the breakdown of history specified by the user, from the asset transfer screen. The group depreciation engine also generates a depreciation catch-up document. However, according to the principle of retirement ledger, depreciation is not recorded in the retirement ledger. The depreciation catch-up document will be purely accounting postings without retirement ledger entry and will be described in the Group Depreciation Specification.

Retirement Ledger entries give proper meanings to the transaction lines. Source Transaction dimension will be used by the Plant Account Balance Report and Roll-forward Report, breaking down the balance into conversion, addition, retire, transfer, and manual adjustment; while in the life analysis report, Activity dimension will provide the purpose in terms of addition or retire. Under life analysis, the "conversion", "transfer", or "manual adjustment" are simply "noise".

The software architecture, through the various components also support retirement postings of mass assets. The retired units (i.e., retired portions of mass assets) shall be fully accrued upon retirement. It means the units shall be retired as if the units have already been fully accrued (depreciated). With the same example above, suppose 10 poles worth of $10,000 with life of 10 years. 2 poles retired in year 5; and the rest of poles retired in year 10. FIG. 14 shows an example table of the per year retirement by the software architecture.

By end of 2014, when the 2 poles were retired, the CPR unitization and retirement engine credits the full original cost of the 2 poles and debits the same full amount to the Reserve (implying that the 2 poles had already fully depreciated). Thus, the following are desired.

| | | |
|---|---|---|
| Cr. Asset1 | APC (101) | $−2,000 |
| Dr. Asset1 | Reserve (108) | $ 2,000 |

With the existing asset system, by default the units being retired is not seen as fully depreciated. With the example above, the existing asset system would post below. The reason why the Profit/Loss account would be debited by $1,000 is due to the existing asset system's retirement engine does not assume the unit's cost has been fully depreciated. However, debiting the Profit/Loss account does not meet mass asset retirement requirement following public utility accounting principle.

| | | |
|---|---|---|
| Cr. Asset1 | APC | $−2,000 |
| Dr. Asset1 | Value Adjustment (Accumulated Depreciation) | $ 1,000 |
| Dr. CCtr1 | Profit/Loss | $ 1,000 |

(The Value Adjustment line in the above posting is on the asset with the accumulated depreciation account. With the existing asset system standard logic, it can be differentiated from the ordinary accumulated depreciation. For example, in the Asset History Sheet report, Value Adjustment appears in a different line from Ordinary Depreciation.)

Thus, there is a different between the existing asset system posting and the desired retirement posting for mass asset. The CPR unitization and retirement engine makes retirement posting compliant to public utility accounting principle. The following outline several approaches by the CPR unitization and retirement engine.

One approach is through retirement without gross salvage. The software architecture introduces a Reserve-Retired Depreciation Accrual (Reserve 1) asset, and then use an acquisition posting to accomplish the effect of the retirement posting. With the example above, the retirement of the 2 poles by end of 2014, through a posting:

| | | |
|---|---|---|
| Cr. PIS Asset | APC Reconciliation Account (101) | −2,000 |
| Dr. Reserve1 Asset | Accumulated Depreciation | 2,000 |

Reserve1 Asset balance will be included into the asset balance report as part of the accumulated depreciation.

Another approach uses retirement with gross salvage. With the same philosophy, the retirement with gross salvage shall just add the gross salvage lines to the retirement posting, as shown below.

| | |
|---|---|
| Cr. PIS Asset APC Reconciliation Account (101) | −2,000 |
| Dr. Reserve 1 Asset Accumulated Depreciation | 2,000 |
| Cr. Reserve3 Asset Gross Salvage (108) | −100 |
| Dr. Gross Salvage Clearing Account | 100 |

The above postings could be done in one accounting document per CPR record.

The cost of removal balance is counted under Reserve, while the balance is established as part of the "unitization" process, rather than the retirement process, meaning the Reserve 2 balance is established from RWIP, similarly like the PIS balance is established from CWIP, in the unitization process.

Returning to FIG. 1, the group depreciation engine (116) manages assets depreciation in groups. A first possibility is to leverage the existing asset system's standard Fixed Asset for the purpose. However, the existing asset system's Group Asset is very "attached" to net book value (NBV) concept. The NBV concept is against the public utility depreciation principle, that NBV is not such a meaningful concept and shall not interfere with depreciation or retirement. For example, existing asset system's Group Asset enforces all the underline assets to have NBV of the same direction: either they are all positive balances, or they are all negative balances. In contrast, some retirement units might have positive NBV, while others might have negative NBV. Additionally, the existing asset system's Group Asset is quite rigid. Once an asset is added to a group asset, it cannot be moved outside of the group asset, or change to a different group asset. Further, the depreciated amounts on group asset are slightly different than if the depreciation is done on each asset level. Therefore, the result is sometimes confusing. Additionally, CCNC asset is supposed to be assigned to the same group asset with the PIS. Quite likely, the asset group will be across multiple vintage years. CCNC is across vintage years too. However, for a new year, if the retirement unit needs to be assigned to a different group, CCNC asset cannot be assigned to the new group asset, because of existing asset system's restriction that an asset cannot be assigned to a different group asset. Additionally, end users may update depreciation rates on group level. It could be technically achieved in a simple way without SAP Group Asset.

Thus, one or more embodiments add an Asset Group concept in the computing architecture as a master data. The computing architecture uploads and maintains Asset Groups as a master data to set up in the initial phase. The Asset Group, once established, could be used across years. The Asset Group shall conceptually be stored in a database table (1500) such as shown in FIG. 15. The computing architecture has a design to assign the retirement unit, and consequently the CPR records, to Asset Groups.

To support time-dependent group depreciation rate, a table described in table structure (1600) of FIG. 16 may be used for the user to maintain group depreciation rates, retirement dispersion curve, average service life. The group depreciation engine performs the depreciation based on an official depreciation study in which results are approved by public utility commission. Therefore, the computing architecture provides an easy way to help user to maintain many asset groups. Namely, the user does not need to manage each asset's depreciation rate individually, but just need to maintain the relatively small number of asset groups.

The group depreciation engine overwrites the existing asset system's standard depreciation rate logic with the depreciation rate from assigned Asset Group. The two add-ins are FAA_EE_CUSTOMER and FAA_DC_CUSTOMER.

Continuing with FIG. 1, the flexible asset order (118) is an information and action hub for asset accounting manager, to collect the capital cost during the capital project, and control the cost distribution to different retirement units, following the as-planned or as-built information.

The computing architecture (102) also provides several views through which the mass assets may be managed, and reporting may be performed. The CPR CDS (Core Data Service) view engine (120) is configured to present and manage the various user interfaces using the retirement ledger (112) and the existing universal journal (108). In particular, the CPR CDS view engine (120) provides back-end support for the manage CPR user interfaces (122) and the CPR reporting and analytics user interfaces (124). The various manage CPR user interfaces (122) and the CPR reporting and analytics user interfaces (124) are presented in FIGS. 17-23.

Figure 17:
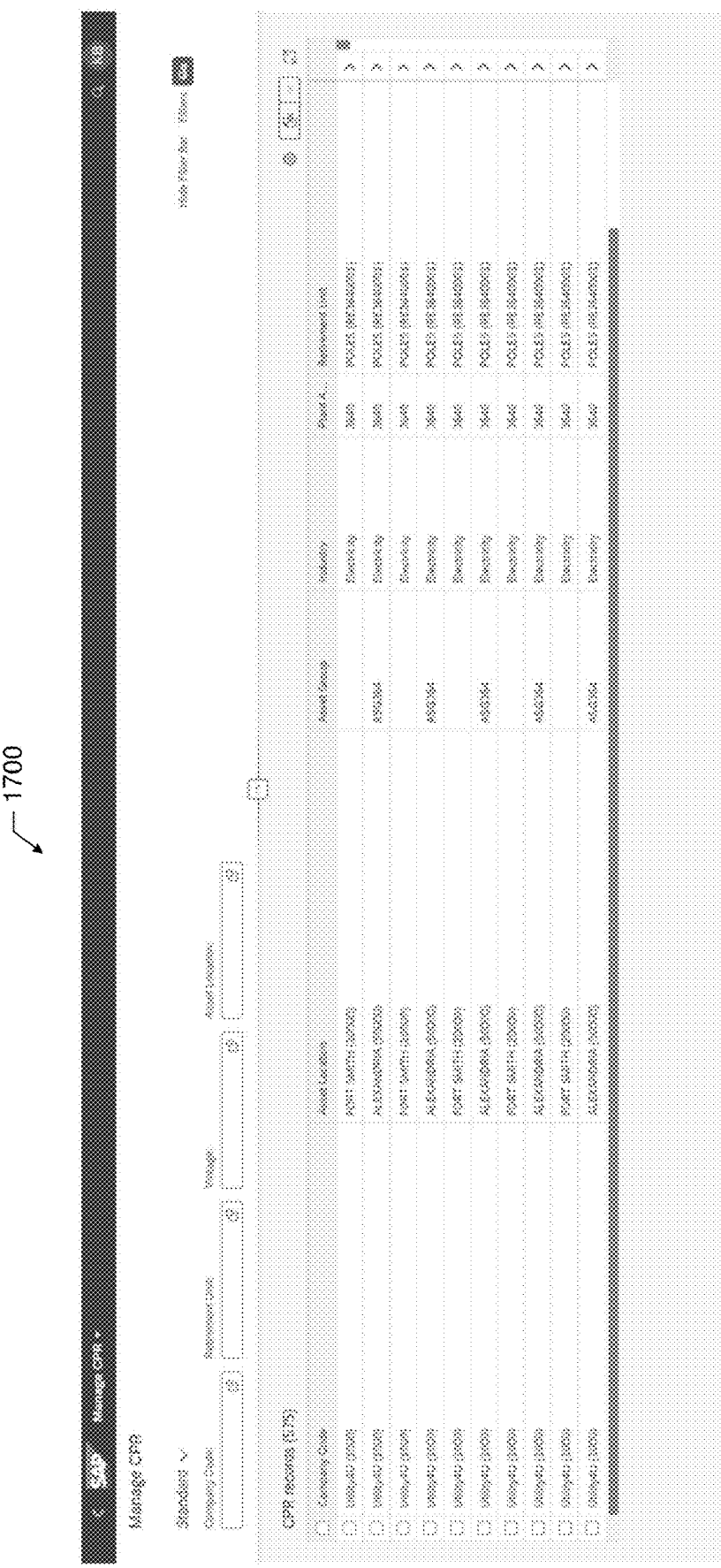

A manage CPR user interface (1700) is shown in FIG. 17. The interface is the main screen for an end user to review and manage CPR. The user may select one of the mass assets in the list of the mass assets to drill down and obtain additional details.

Figure 18:

FIG. 18 shows a CPR details user interface (1800). In the example shown in FIG. 18, the asset balances are shown with the chart. Also, the CPR attributes are shown as well.

Figure 19:

FIG. 19 shows a life analysis user interface (1900) from the reporting and analytics interface. The life analysis user interface (1900) shows the installation and retirement history of an asset in terms of amounts and quantities.

Figure 20:
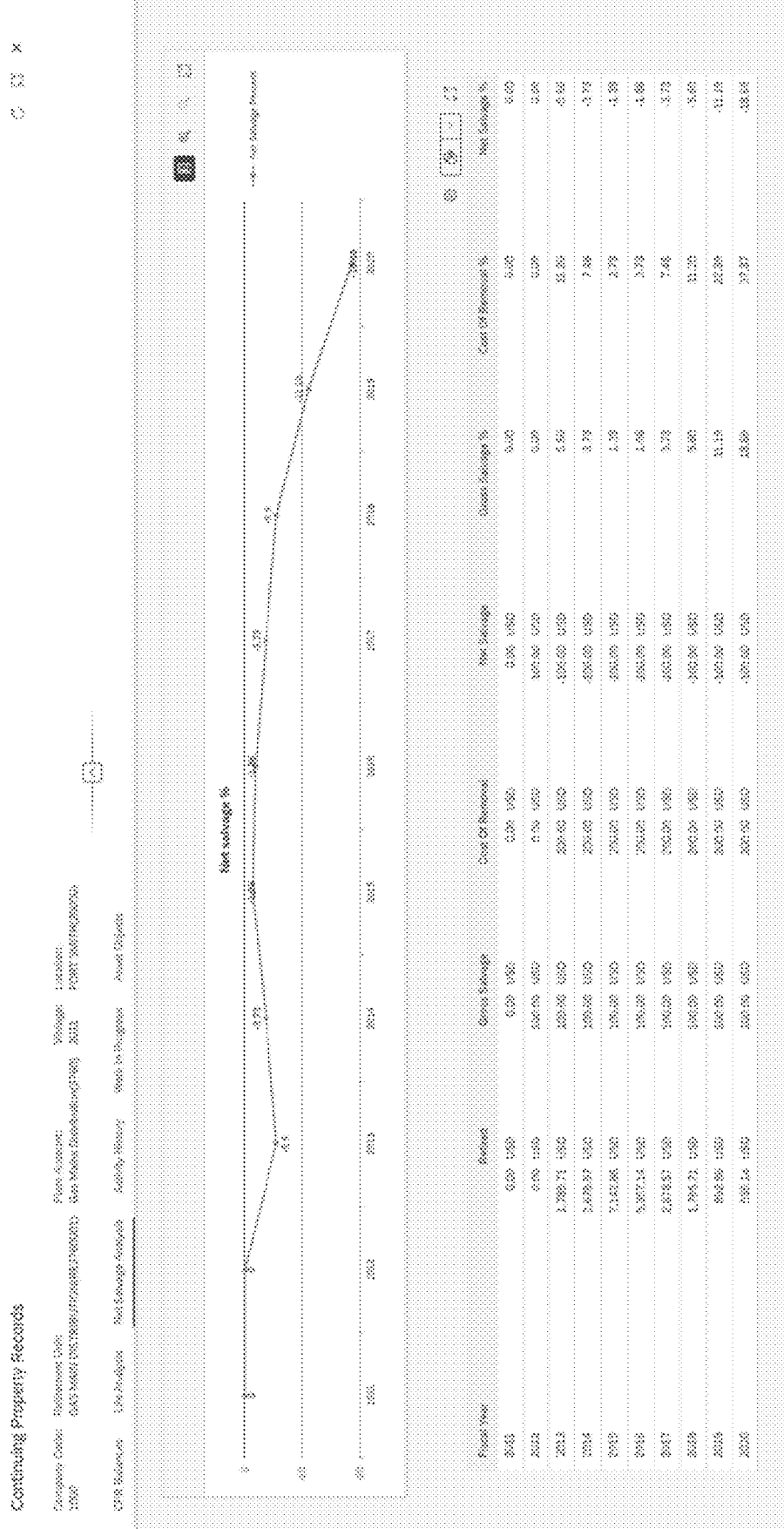

FIG. 20 shows a net salvage analysis user interface (2000). The net salvage analysis user interface (2000) shows the trend of net salvage amounts and ratios in comparison to retired amounts in the last years.

Figure 21:
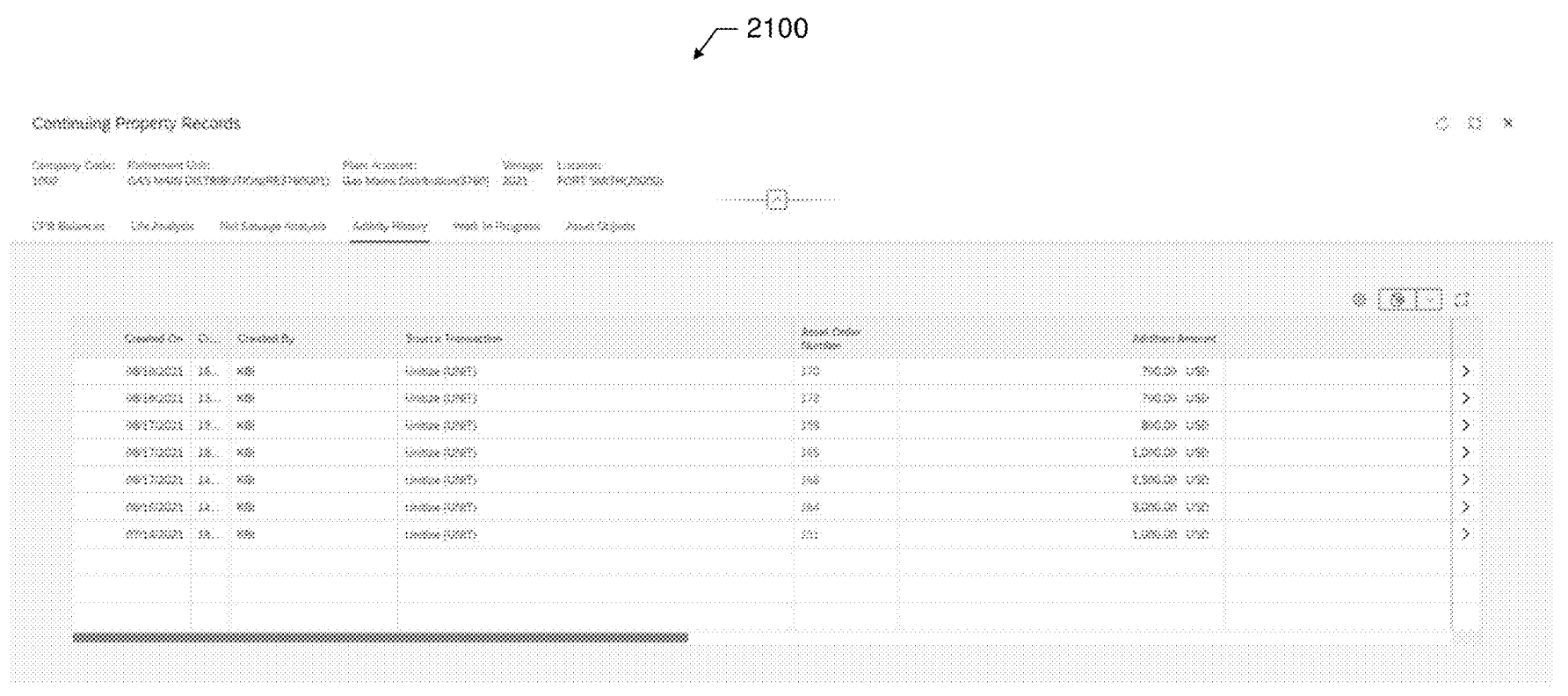

FIG. 21 shows an activity history user interface (2100). The activity history user interface (2100) shows all completed unitization or retirements activities of the asset.

Figure 22:
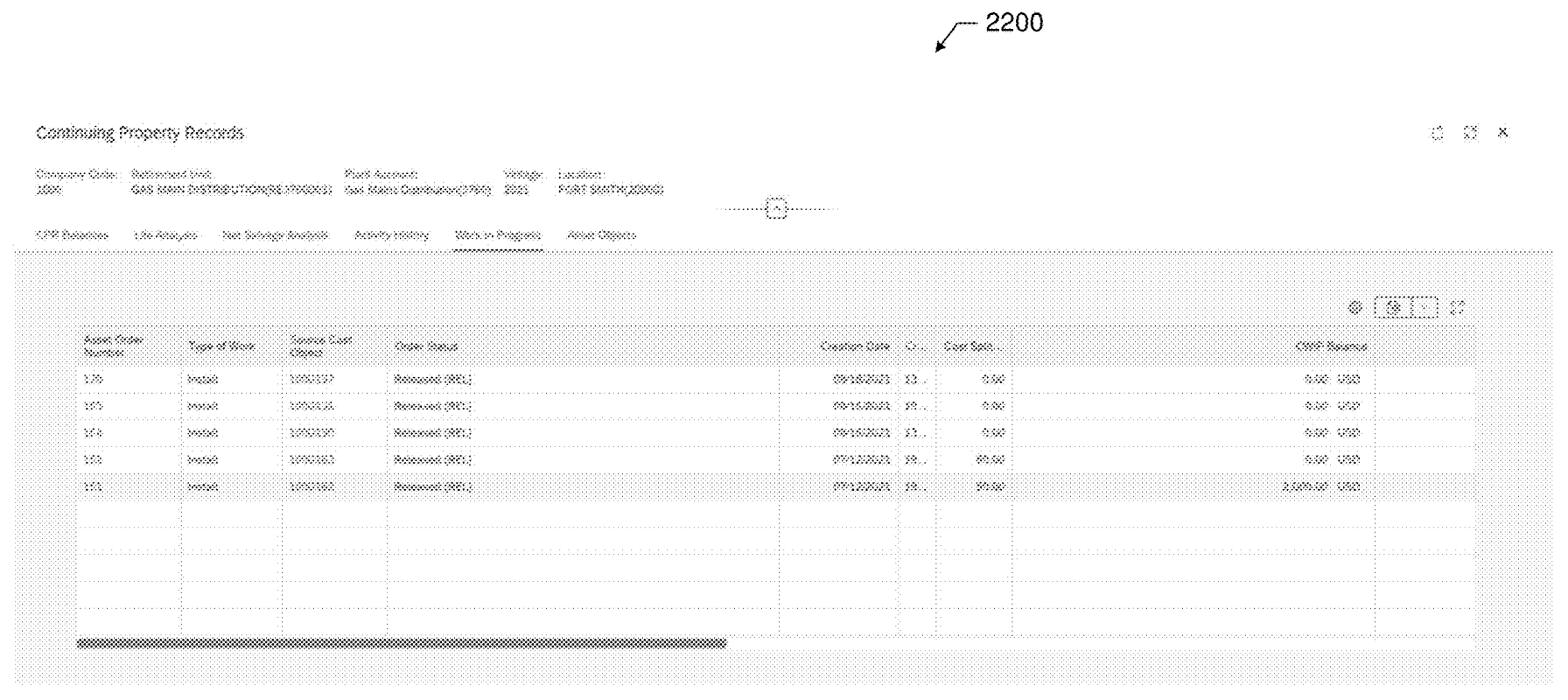

FIG. 22 shows a work in progress user interface (2200). The work in progress user interface (2200) shows the list of asset orders which is under-going on a particular asset.

Figure 23:
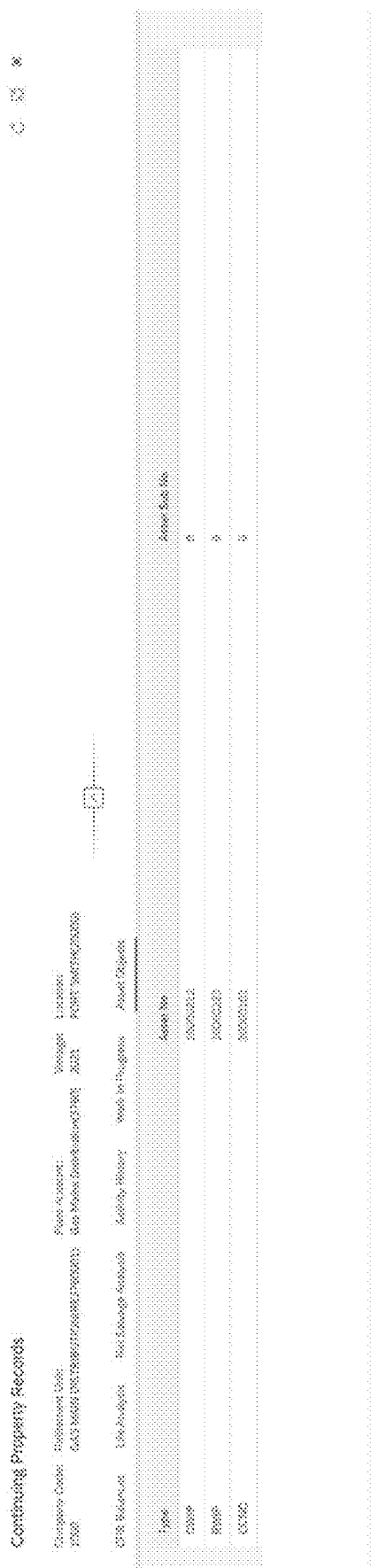

FIG. 23 shows an asset object user interface (2300). The asset object user interface (2300) shows the asset objects included in the CPR record.

Retirement unit defines the smallest item of capitalization and retirement (it could even be called "capitalization unit" in this sense). It defines the border between capital and maintenance expense. Utility companies maintain assets on retirement unit level. For example, in property accounting book, a substation is not one asset; rather, it consists of multiple assets each of which represents a retirement unit of the substation. Retirement unit is smaller than plant account (FERC 300 accounts); each retirement unit is categorized into one plant account. For unregulated utilities, quite likely only retirement units are required, without plant accounts.

Retirement unit is such a critical concept of utility property accounting defining all perspectives of asset lifecycle: from the design of capital work, asset creation, unitization, depreciation, retirement, to reporting and analytics. A general data processing system Fixed Asset module does not have an explicit concept of retirement unit. This is one of the major functional gaps filled by the software architecture.

Figure 24A:
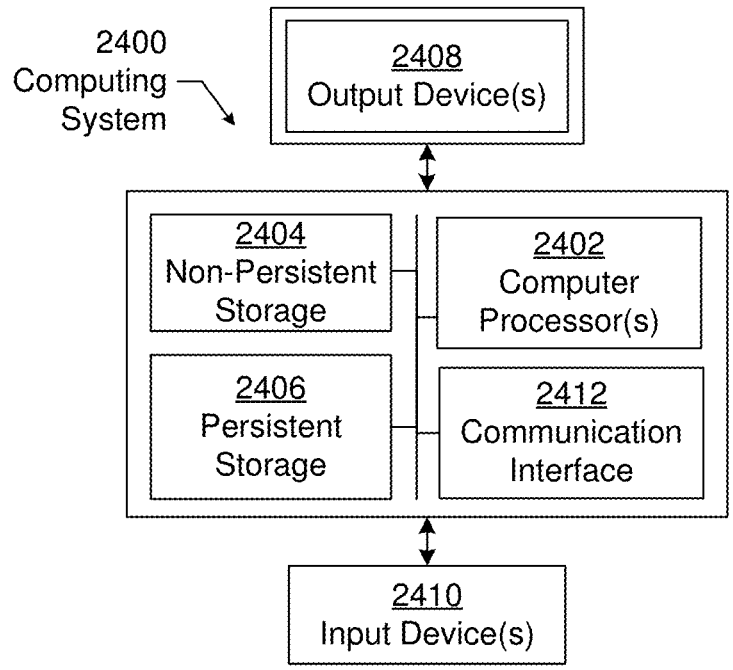
FIG. 24A and FIG. 24B show a computing system in accordance with one or more embodiments of the invention.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 24A, the computing system (2400) may include one or more computer processors (2402), non-persistent storage (2404) (e.g., volatile memory, such as random access memory (RAM), cache memory), persistent storage (2406) (e.g., a hard disk, an optical drive such as a compact disk (CD) drive or digital versatile disk (DVD) drive, a flash memory, etc.), a communication interface (2412) (e.g., Bluetooth interface, infrared interface, network interface, optical interface, etc.), and numerous other elements and functionalities that implement the features and elements of the disclosure.

The computer processor(s) (2402) may be an integrated circuit for processing instructions. For example, the computer processor(s) may be one or more cores or micro-cores of a processor. The computing system (2400) may also include one or more input devices (2410), such as a touchscreen, keyboard, mouse, microphone, touchpad, electronic pen, or any other type of input device.

The communication interface (2412) may include an integrated circuit for connecting the computing system (2400) to a network (not shown) (e.g., a local area network (LAN), a wide area network (WAN) such as the Internet, mobile network, or any other type of network) and/or to another device, such as another computing device.

Further, the computing system (2400) may include one or more output devices (2408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (2402), non-persistent storage (2404), and persistent storage (2406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Various components may be stored in a data repository. The data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

Figure 24B:
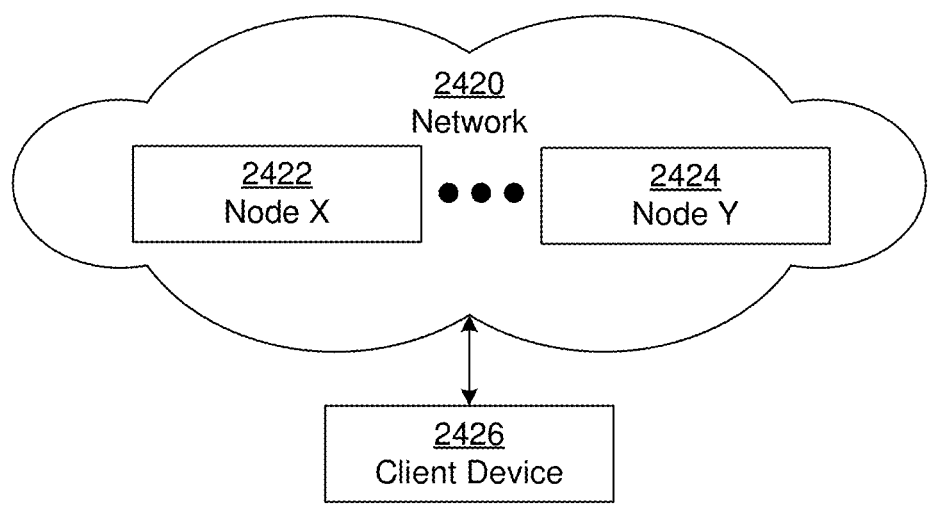

The computing system (2400) in FIG. 24A may be connected to or be a part of a network. For example, as shown in FIG. 24B, the network (2420) may include multiple nodes (e.g., node X (2422), node Y (2424)). Each node may correspond to a computing system, such as the computing system shown in FIG. 24A, or a group of nodes combined may correspond to the computing system shown in FIG. 24A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (2400) may be located at a remote location and connected to the other elements over a network.

Although not shown in FIG. 24B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (2422), node Y (2424)) in the network (2420) may be configured to provide services for a client device (2426). For example, the nodes may be part of a cloud computing system. The nodes may include functionality to receive requests from the client device (2426) and transmit responses to the client device (2426). The client device (2426) may be a computing system, such as the computing system shown in FIG. 24A. Further, the client device (2426) may include and/or perform all or a portion of one or more embodiments of the invention.

The computing system or group of computing systems described in FIGS. 24A and 24B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 24A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 24A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU.

In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 24A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 24A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 24A and the nodes and/or client device in FIG. 24B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for implementing a computing architecture for managing retirement of mass assets comprising:
   a memory storing program instructions and a processor configured to execute the program instructions stored in the memory and configured to:
   generate a continuous property record (CPR) data structure comprising:
      a retirement unit field, an asset location field, and a vintage field for each mass asset of a plurality of mass assets, wherein the retirement unit field maintains an identifier of the mass asset, the asset location field storing a region of installation of the mass asset, the vintage field storing a date of the mass asset, wherein the CPR data structure is a wrapper for a corresponding master data structure of an asset system, and wherein the CPR data structure maintains a plurality of asset objects for each CPR with a plurality of asset types in the data structure indicating a purpose of the plurality of asset objects, and wherein semantics of the asset object types are represented through the CPR data structure of the computing architecture, the CPR data structure of the computing architecture tags each of the asset objects with the corresponding asset object type such that each of the asset objects has a specific meaning when used by the computing architecture, and wherein the CPR data structure acts as a wrapper to the asset objects, thereby representing mass assets, and wherein a graphical user interface (GUI) is configured to:
         determine the asset object type associated with the asset object by obtaining data from a data attribute within the asset object that identifies the asset object type,
         determine rules designated for displaying that asset object type according to local parameters defined by the GUI for presenting the asset object type;
         obtain data values from the asset data object; and
         render a visual representation of the data values within a display device according to the determined rules for displaying the asset object type;
   a retirement ledger for maintaining a plurality of postings for the plurality of mass assets, wherein the retirement ledger maintains at least one line for each transaction using the plurality of mass assets, and wherein the retirement ledger comprises multiple line items of a transaction identified by an activity field and an activity identification (ID); and
   a CPR unitization and retirement engine for updating the retirement ledger by adding lines via a utility class, wherein the CPR unitization and retirement engine optimizes retirement scenarios based on historical data maintained in the retirement ledger, thereby enhancing efficiency and accuracy of mass asset management, wherein the system is configured to organise the plurality of mass assets into asset groups by enabling linking of dimensions of a retirement unit object, asset location object and a vintage object leading to collective, comprehensive analysis and evaluation of the grouped assets.

2. The system as claimed in claim 1, wherein the plurality of asset types comprising Construction Work in Progress (CWIP), Removal Work in Progress (RWIP), Construction Completed Not Classified (CCNC), Plant in Service (PIS), a retired depreciation accrual, a cost of removal, and a gross salvage.

3. The system as claimed in claim 1, wherein the CPR mass asset data structure further comprises:
an asset type for storing removal work in progress as an asset object.

4. The system as claimed in claim 1, wherein the CPR mass asset data structure further comprises:
an asset type for storing a gross salvage amount as an asset object.

5. The system as claimed in claim 1, wherein the retirement ledger comprises an offset balance that offsets a balance in a leading ledger of the existing asset system.

6. The system as claimed in claim 1, wherein the retirement ledger comprises a precise installation and retirement activity history of the plurality of mass assets reflecting an asset operational view.

7. The system as claimed in claim 1, wherein the CPR unitization and retirement engine synchronizes the retirement ledger with a universal journal of the existing asset system.

8. The system as claimed in claim 1, further comprising:
a CPR core data service (CDS) view engine for obtaining and presenting a plurality of reports from an existing universal journal and the retirement ledger.

9. The system as claimed in claim 8, further comprising:
manage CPR user interfaces for presenting a listing of the plurality of mass assets.

10. The system as claimed in claim 9, wherein the manage CPR user interfaces comprises a series of charts and reports to present asset balances, life analysis, net salvage analysis, work history, and work in progress.

11. The system as claimed in claim 8, wherein the CPR CDS view engine is configured to receive a selection of a mass asset from the listing and present a detailed view of the mass asset using the CPR mass asset data structure.

12. The system as claimed in claim 1, further comprising:
a group depreciation engine configured to manage a depreciation of mass assets, overwriting a depreciation base amount and a depreciation rate of the existing asset system with a survived asset balance and depreciation rates from an asset group of a mass asset.

13. The system as claimed in claim 1, wherein the CPR mass asset data structure further comprises:
an asset type object for storing an accumulated depreciation as an asset.

14. The system as claimed in claim 1, wherein the retirement ledger comprises an offset balance that offsets a balance in a leading ledger of the existing asset system.

15. A method for implementing a computing architecture for managing retirement of mass assets via a processor executing program instructions stored in a memory, the method comprising steps of:

generating a continuous property record (CPR) data structure comprising:
a retirement unit field, an asset location field, and a vintage field for each mass asset of a plurality of mass assets, wherein the retirement unit field maintains an identifier of the mass asset, the asset location field storing a region of installation of the mass asset, and the vintage field maintaining a date of the mass asset,
wherein the CPR data structure is a wrapper for a corresponding asset master data structure, wherein the CPR data structure comprises an data structure to store a plurality of asset objects for each CPR, with a plurality of asset types in the data structure indicating a purpose of the plurality of the asset objects, and wherein semantics of the asset object types are represented through the CPR data structure of the computing architecture, the CPR data structure of the computing architecture tags each of the asset objects with the corresponding asset object type such that each of the asset objects has a specific meaning when used by the computing architecture, and wherein the CPR data structure acts as a wrapper to the asset objects, thereby representing mass assets, and wherein a graphical user interface (GUI):
determines the asset object type associated with the asset object by obtaining data from a data attribute within the asset object that identifies the asset object type,
determines rules designated for displaying that asset object type according to local parameters defined by the GUI for presenting the asset object type;
obtains data values from the asset data object; and
renders a visual representation of the data values within a display device according to the determined rules for displaying the asset object type;
maintaining a plurality of postings for the plurality of mass assets, wherein a retirement ledger maintains at least one line for each transaction using the plurality of mass assets, and wherein the retirement ledger comprises multiple line items of a transaction identified by an activity field and activity identification (ID); and
updating the retirement ledger by adding lines via a utility class, wherein the CPR unitization and retirement engine optimizes retirement scenarios based on historical data stored in the retirement ledger, thereby enhancing the efficiency and accuracy of mass asset management, wherein the plurality of mass assets is organised into asset groups by enabling linking of dimensions of a retirement unit object, asset location object and a vintage object leading to collective, comprehensive analysis and evaluation of the grouped assets.

16. The method as claimed in claim 15, the operations further comprising:
synchronizing the retirement ledger with a universal journal of the existing asset system.

17. The method as claimed in claim 15, the operations further comprising:
obtaining and presenting a plurality of reports from an existing universal journal.

18. The method as claimed in claim 17, the operations further comprising:
presenting a listing of the plurality of mass assets.

* * * * *